United States Patent Office 3,264,540
Patented August 2, 1966

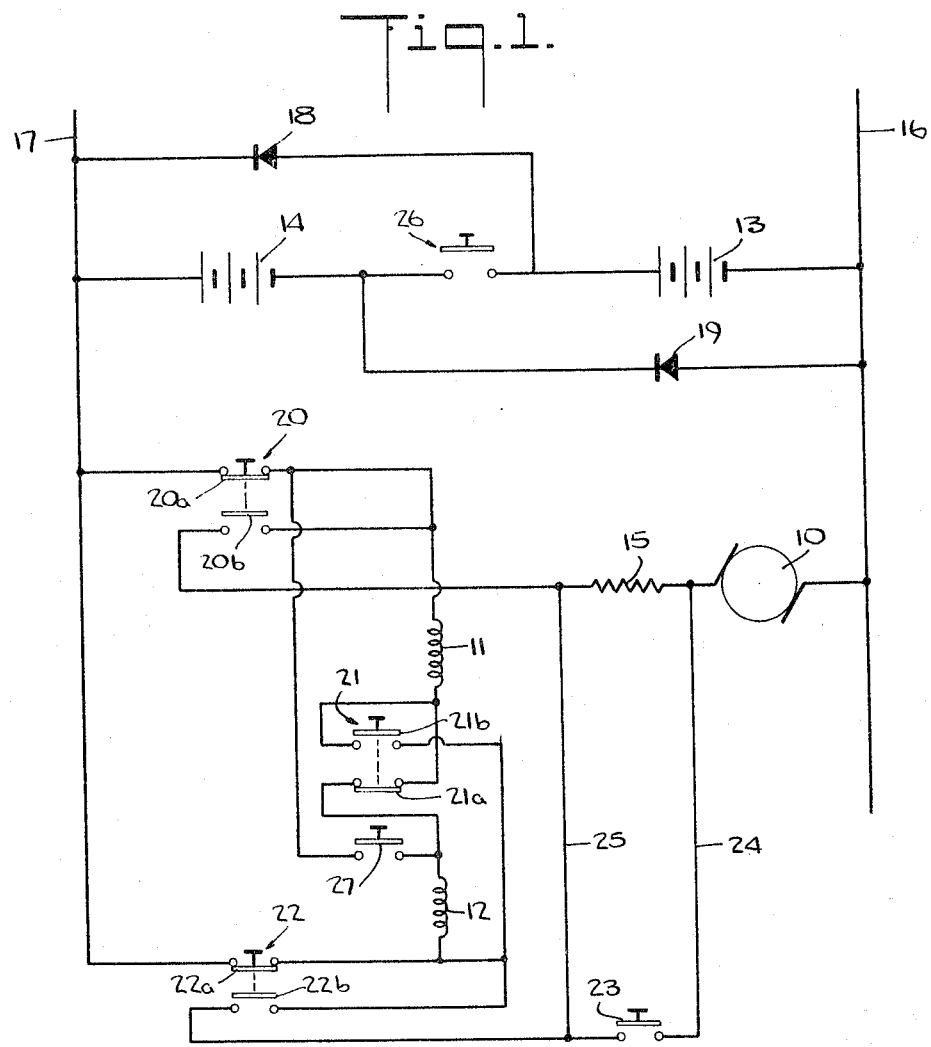

3,264,540
SYSTEM OF CONTROLLING SPEED OF ELECTRIC DRIVE MOTOR OF INDUSTRIAL TRUCK
Alan C. Dannettell, Philadelphia, Pa., assignor, by mesne assignments, to Eaton Yale & Towne, Inc., a corporation of Ohio
Filed Mar. 29, 1962, Ser. No. 183,599
7 Claims. (Cl. 318—139)

This invention relates to a motor control system and method for controlling the speed of a battery operated electric traction motor of an industrial truck.

While various control systems have heretofore been proposed and used for the traction motors of such trucks, they have not been completely satisfactory from the viewpoint of efficiency, smoothness of speed regulation, and simplicity. In fact, the most commonly used system in which the speed of the traction motor is regulated by varying the resistance in the motor circuit is very inefficient in that it has extremely large resistance losses, resulting in substantial heat which must be dissipated. This, of course, poses problems in designing the truck to provide for proper dissipation of the heat and also requires frequent recharging of the batteries due to the resistance losses. However, even with these disadvantages, this system has been considered the best control system until this time, and the majority of industrial trucks now in use incorporate such a system.

While other systems have been proposed and used, they have for the most part been discarded either because of the complexity thereof, or because they do not provide the desired smoothness of speed regulation so that there is objectionable lurch or jump of the truck as the speed of the truck is changed.

The purpose of this invention is to provide a very simple, low cost motor control system which is very satisfactory, both from the viewpoint of efficiency and from the viewpoint of smoothness of speed regulation.

To this end, the system of the invention utilizes a resistor, two field windings, and two batteries of substantially equal voltage, and provides the desired speed regulation by connecting these elements in the motor circuit in a novel sequence. Thus, in accordance with the invention, a first speed is obtained by connecting the two batteries in parallel with each other, with one battery connected in parallel through a rectifier in series therewith of opposite polarity from that of the other battery and the other battery connected in parallel through a rectifier in series therewith of opposite polarity from that of the one battery, connecting the two field windings in series, and connecting the parallel connected batteries, the series connected field windings and the resistor in series with the armature of the motor. A second speed is obtained by short circuiting the resistor. A third speed is obtained by reinserting the resistor in series with the armature of the motor and connecting the two batteries in series with each other while maintaining the parallel circuits through the rectifiers so that the batteries are not disconnected from the circuit during the change from parallel to series connection. A fourth speed is obtained by short circuiting the resistor. A fifth speed is obtained by reinserting the resistor, short circuiting one field winding while maintaining the other field winding in series with the motor armature, and then connecting the one field winding in parallel with the other field winding. A sixth speed is otbained by again short circuiting the resistor.

As a feature of the invention, the two rectifiers have essentially the same resistance characteristics, so that the two parallel circuits of the batteries are substantially balanced, regardless of the load on the batteries, to prevent unequal discharge of the batteries.

The invention and its advantages having been broadly described, a more detailed description of one embodiment of the invention is given hereafter by reference to the accompanying drawings, wherein:

FIG. 1 is a wiring diagram of a control system constructed in accordance with the invention, and FIG. 2 is a chart showing which of the control elements, i.e. the resistor, field windings and batteries, are in the circuit at any given speed, and whether the batteries and field windings are in series or parallel for the given speed.

Referring to the drawings, and in particular to FIG. 1, there is shown a simplified diagram of a motor control system constructed in accordance with the invention. In the diagram, the armature of the motor is indicated by the reference numeral 10, the two field windings of the motor are indicated by the reference numerals 11 and 12, the two batteries by the reference numerals 13 and 14, and the resistor by the reference numeral 15.

For simplicity, the switches of the control circuit are shown as manually operable switches. It will be appreciated, however, that the switches may be actuated by suitable relays, with the relays in turn being energized to actuate the switches in the desired sequence by a suitable controller. The switches may also be formed as a part of a suitable controller, such as a drum controller, whereby the switches are actuated directly in the proper sequence by movement of the controller handle.

The chart of FIG. 2 shows which of the control elements are in the circuit for a given motor speed, and in the case of the field windings and the batteries, whether they are connected together in parallel or in series. Thus the letter "I" under the heading "Resistor" indicates that the resistor is in the circuit for the particular speed, while the letter "O" indicates that the resistor is shorted out at the particular speed. Similarly, an "S" under the heading "Batteries" or "Field Windings" indicates that the batteries or field windings are connected together in series, while a "P" under these headings indicates that the batteries or field windings are connected together in parallel for the particular speed.

Referring again to the diagram of FIG. 1, at zero speed the switches are in the position as shown in the diagram. In this position of the switches, the battery 13 is connected between the lines 16 and 17 through a rectifier, or other type of uni-directional conductor 18. The battery 14 is connected between the lines 16 and 17, in parallel with the battery 13, through a rectifier, or other type uni-directional conductor 19. The field windings 11 and 12 are short circuited through the circuit formed through closed contacts 20a of a switch 20, closed contacts 21a of a switch 21 and closed contacts 22a of a switch 22. The circuit to the resistor 15 and the armature 10 is broken by open contacts 20b of switch 20 and open contacts 22b of switch 22.

A first speed is obtained by actuating switch 20 to open contacts 20a and close contacts 20b. Closing of contacts 20b completes a circuit from line 16 to line 17 through the motor armature 10, the resistor 15, the field winding 11, closed contacts 21a of switch 21, the field winding 12, and closed contacts 22a of switch 22. Thus, at this point, the batteries 13 and 14 are in parallel with each other and in series with the field windings 11 and 12, the resistor 15 and the motor armature 10, as indicated by the chart of FIG. 2, to give a slow first speed.

A second slightly higher speed is obtained by closing a switch 23 to form a short circuit through lines 24 and 25 around the resistor 15, thereby cutting out the resistor 15 from the circuit. Thus, at this point, the batteries 13 and 14 are in parallel with each other, the field windings 11 and 12 are in series with each other and the resistor 15 is out, as indicated in the chart of FIG. 2 opposite speed 2.

A third higher speed is obtained by again opening switch 23 to reinsert the resistor 15 into the circuit, and by closing a switch 26. Closing switch 26 connects batteries 13 and 14 in series. When the switch 26 is closed to connect batteries 13 and 14 in series with each other, the rectifier 18, which is of opposed polarity from that of the battery 14, prevents the battery 14 from being short circuited through the parallel circuit containing the rectifier 18, while the rectifier 19, which is of opposite polarity from the battery 13, prevents the battery 13 from being short circuited through the parallel circuit containing the rectifier 19. This arrangement allows the batteries 13 and 14 to remain in the circuit during the change from parallel to series connection so that there is no sudden lurch of the truck as would occur if both batteries 13 and 14 were completely disconnected from the circuit and then reconnected in series. Thus, at this point, the resistor 15 is in the circuit. The batteries 13 and 14 are connected together in series, and the field windings 11 and 12 are connected in series, as indicated by the chart of FIG. 2 opposite the speed 3. While additional switches may be provided to break the parallel circuits through the rectifiers 18 and 19 after the switch 26 has been closed to connect the batteries 13 and 14 in series, it has been found that such switches are not necessary. The reason for this is that when the switch 26 is closed, the battery 14 impresses a voltage on the rectifier 18 which is opposite and equal to that of the battery 13, thereby preventing flow of current from battery 13 through the parallel circuit containing rectifier 18. Similarly, the battery 13 impresses a voltage on the rectifier 19 which is opposite and equal to that of the battery 14 thereby preventing flow of current through the parallel circuit containing the rectifier 19. Thus, only the series connection of the batteries is effective after the switch 26 is closed, even though the parallel circuits through the rectifiers 18 and 19 are not broken.

A fourth speed is obtained by again closing switch 23 to short circuit the resistor 15. Thus, at this point, the batteries 13 and 14 are in series, the field windings 11 and 12 are in series, but the resistor is out of the circuit, as indicated by the chart of FIG. 2 opposite the speed 4.

A fifth speed is obtained by opening switch 23 to reinsert the resistor 15 into the circuit, closing a switch 27, and thereafter actuating switch 21 to close contacts 21b and open contacts 21a. Closing switch 27 forms a short circuit around field winding 11 so that only field winding 12 remains in the circuit. The subsequent opening of contacts 21a of switch 21 breaks the series connection between the field winding 11 and field winding 12, while the closing of contacts 21b connects the field winding 11 in parallel with the field winding 12. Thus, at this point, the resistor 15 is in the circuit, the batteries 13 and 14 are connected in series, and the field windings 11 and 12 are connected in parallel, as indicated by the chart of FIG. 2 opposite speed 5.

A sixth speed is obtained by again closing the switch 23 to again short out the resistor 15. Thus, at this point, the batteries 13 and 14 are connected in series, the field windings 11 and 12 are connected in parallel, but the resistor 15 is out of the circuit, as indicated by the chart of FIG. 2 opposite speed 6.

Thus, by the sequence described, the speed of the traction motor of the truck is gradually increased through six speed steps. The speed of the motor can again be gradually decreased by merely reversing the sequence of the actuation of the switches as previously described. The direction of operation of the traction motor may be reversed by actuating the switch 22, instead of the switch 20, to reverse the direction of current flow through the field windings. The switches are then actuated in the same sequence as previously described to give a gradual stepped increase in speed of the motor in the reverse direction.

As a feature of the invention, the two rectifiers 18 and 19 have essentially the same resistance characteristics so that the parallel circuit of battery 13 is automatically matched to the parallel circuit of battery 14 to insure substantially equal discharge of the two batteries when they are connected in parallel, regardless of the load imposed on the batteries.

From the preceding description, it can be seen that there is provided a very simple, low cost, rugged, dependable motor control system for an industrial truck which may be easily fabricated from readily available standard components, and which is very efficient and provides very smooth speed regulation or acceleration of the truck.

While a preferred form of the invention has been shown and described, it will be appreciated that this is for the purpose of explanation and that changes and modifications may be made therein without departing from the spirit and scope of the invention.

I now claim:

1. A system for controlling the speed of a battery operated electric traction motor of an industrial truck having an armature and two field windings comprising,
   first and second batteries,
   two uni-directional conductors,
   a resistor,
   means for connecting the two batteries in parallel with each other, with one battery being connected in parallel through one uni-directional conductor in series therewith in a position of opposite polarity from that of the other battery and the other battery connected in parallel through the other uni-directional conductor in series therewith in a position of opposite polarity from that of the one battery, for connecting the two field windings in series, and for connecting the parallel connected batteries, the series connected field windings and the resistor in series with the armature of the motor to obtain a first speed,
   means for short circuiting the resistor to obtain a second speed,
   means for reinserting the resistor in series with the armature of the motor, and means for connecting said first and second batteries in series and simultaneously placing each uni-directional conductor in parallel with the other battery while keeping it in series with the battery of its first connection whereby current will continue to flow uninterrupted in series to provide a third speed,
   means for short circuiting the resistor to obtain a fourth speed,
   means for reinserting the resistor in series with the armature of the motor, for short circuiting one field winding while maintaining the other field winding in series with the motor armature, and for connecting the one field winding in parallel with the other field winding to obtain a fifth speed, and
   means for short circuiting the resistor to obtain a sixth speed.

2. A system for controlling the speed of a battery operated electric traction motor of an industrial truck having an armature and two field windings comprising,
   first and second batteries,
   two uni-directional conductors having substantially the same resistance characteristics,
   means for connecting the two batteries in parallel with each other, with one battery connected in parallel through one uni-directional conductor in series therewith in a position of opposite polarity from that of the other battery and the other battery connected in parallel through the other uni-directional conductor in series therewith in a position of opposite polarity from that of the one battery, for connecting the two field windings in series, and for connecting the parallel connected batteries, and the series connected field windings in series with the armature of the motor to obtain a first speed, means for connecting said first and second batteries in series and simultaneously placing each uni-directional conductor in parallel with the other battery while keeping it in series with the battery of its first connection whereby current will continue to flow uninterrupted in series to provide a higher speed, and means for short circuiting one field winding while maintaining the other field winding in series with the motor armature, and for connecting the one field winding in parallel with the other field winding to obtain a still higher speed.

3. A system for controlling the speed of a battery operated electric traction motor of an industrial truck having an armature and two field windings, first and second batteries, a uni-directional conductor having substantially the same resistance characteristics connected in series with each battery, with the polarity thereof opposite that of the other battery, means for connecting the two batteries in parallel with each other, with one battery connected in parallel through the uni-directional conductor connected in series therewith of opposite polarity from that of the other battery and the other battery connected in parallel through the uni-directional conductor connected in series therewith of opposite polarity from that of the one battery, and for connecting the parallel connected batteries in series with the armature of the motor to obtain one speed, and means for connecting said first and second batteries in series and simultaneously placing each uni-directional conductor in parallel with the other battery while keeping it in series with the battery of its first connection whereby current will continue to flow uninterrupted in series to increase the speed of the motor.

4. A system for controlling the speed of a battery operated electric traction motor of an industrial truck having an armature and two field windings, first and second batteries, a resistor, a uni-directional conductor connected in series with each battery with the polarity thereof opposite that of the other battery, means for connecting the two batteries in parallel with each other, with one battery connected in parallel through the uni-directional conductor in series therewith of opposite polarity from that of the other battery and the other battery connected in parallel through the uni-directional conductor in series therewith of opposite polarity from that of the one battery, and for connecting the parallel connected batteries and the resistor in series with the armature of the motor to obtain one speed, means for shorting out the resistor to obtain a higher speed, means for reinserting the resistor in series with the armature and means for connecting said first and second batteries in series and simultaneously placing each uni-directional conductor in parallel with the other battery while keeping it in series with the battery of its first connection whereby current will continue to flow uninterrupted in series to provide a further increase of the motor speed.

5. A system for controlling the speed of a battery operated electric traction motor of an industrial truck comprising, two batteries, a uni-directional conductor connected in series with one battery with the polarity thereof opposite that of the other battery, means for connecting the two batteries in parallel with each other across the motor to attain one speed, with the one battery connected in parallel through the uni-directional conductor, means for connecting the two batteries in series with each other while maintaining the parallel circuit through said uni-directional conductor whereby to provide a higher motor speed without disconnecting said one battery from across said motor, and means for preventing short circuiting of said second battery when said two batteries are connected in series.

6. A system for controlling the speed of a battery operated electric traction motor of an industrial truck comprising, first and second batteries, a uni-directional conductor connected in series with each battery with the polarity thereof opposite that of the other battery, means for providing circuits connecting the two batteries in parallel with each other across the motor to attain one speed, with the one battery connected in parallel by a circuit through the uni-directional conductor, means for connecting said first and second batteries in series and simultaneously placing each uni-directional conductor in parallel with the other battery while keeping it in series with the battery of its first connection whereby current will continue to flow uninterrupted to said motor, and said uni-directional conductor which is in parallel with said first battery will prevent short circuiting of said second battery when said two batteries are connected in series.

7. A system for controlling the speed of a battery operated electric traction motor of an industrial truck having an armature and two field windings, a first and second battery connected in parallel and supplying current to said electric motor, a uni-directional conductor in series with each battery and with the polarity of said batteries and said uni-directional conductors such that when said first battery and its uni-directional conductor is in parallel with said second battery and its uni-directional conductor, current will flow in parallel to said motor and cause it to operate at a given speed, and means for connecting said first and second batteries in series and simultaneously placing each uni-directional conductor in parallel with the other battery while keeping it in series with the battery of its first connection whereby current will continue to flow uninterrupted in series to increase the speed of the motor.

References Cited by the Examiner

UNITED STATES PATENTS

| | | | |
|---|---|---|---|
| 1,110,821 | 9/1914 | Radley | 318—412 X |
| 1,324,194 | 12/1919 | Harries | 318—412 X |
| 3,043,990 | 7/1962 | Lillquist | 317—155 X |
| 3,134,063 | 5/1964 | Hastings | 318—139 |
| 3,207,966 | 9/1965 | Parkinson | 318—139 |

ORIS L. RADER, *Primary Examiner.*

S. GORDON, *Assistant Examiner.*